United States Patent [19]

Mizutani

[11] Patent Number: 4,875,640

[45] Date of Patent: Oct. 24, 1989

[54] TAPE CARTRIDGE

[75] Inventor: Hikaru Mizutani, Mino, Japan

[73] Assignee: Hitachi Maxell, Ltd., Osaka, Japan

[21] Appl. No.: 193,071

[22] Filed: May 12, 1988

[30] Foreign Application Priority Data

May 13, 1987 [JP] Japan .................. 62-116133

[51] Int. Cl.⁴ ............................................. G11B 23/087
[52] U.S. Cl. ................................................. 242/198
[58] Field of Search ................. 242/198, 199; 360/132

[56] References Cited

U.S. PATENT DOCUMENTS 4,323,207  4/1982  Gebeke ............................ 242/198
4,589,609  5/1986  Oishi et al. ..................... 360/132 X Primary Examiner—David Werner
Attorney, Agent, or Firm—Birch, Stewart, Kolasch & Birch

[57] ABSTRACT

In a tape cartridge, there is provided a lock member in a side wall of a case body with a lock tip detachably engageable with an engaging recess defined in a front lid of the tape cartridge.

A guiding member for guiding the lock member is provided so that the lock tip can move in parallel with the direction of the thickness of the side wall throughout the movement from a locked state to an unlocked state. A spring member is provided for pressing the lock member towards the locked state.

3 Claims, 5 Drawing Sheets

TAPE CARTRIDGE

BACKGROUND OF THE INVENTION

1. Field of The Invention

The present invention relates to a tape cartridge having a front lid for protecting tape, and more specifically to an improved lock means for holding the front lid in a closed position.

2. Description of The Prior Art

Generally in a tape cartridge there is provided a lock means inside the case body of the tape cartridge so as to lock a front lid in a closed position in order to prevent the front lid from opening and the tape from being damaged when operating the tape cartridge.

As shown in FIG. 1, in a known cartridge there is provided a lock means 15 formed of an elongated plate spring (resilient) member in which the rear end portion is fixed to the inner surface of the rear portion of the side wall 24 of the cartridge case and there is defined a lock tip 16 for detachably engaging an engaging recess 23 defined in an inner surface of an edge portion of a front lid 10. A release button 17 projects from the middle portion of the lock means 15 through a window of the side wall 24 from the inside to the outside of the case and 3 upon depressing the release button 17 from the outside to the inside, the front end portion of the lock means 15 is resiliently biased away from the side wall 24 of the case so as to release the engagement between the lock tip 16 and the engaging recess 23.

In the conventional lock means 15 the plate spring member including the plate portion of the lock means are resiliently biased, whereby the lock tip 16 is detachably engaged with the engaging recess 23 defined in the front lid 10. Moreover, in order to obtain a predetermined spring characteristic, the lock means 15 is held in a cantilevered manner by being fixed to the rear portion of the side wall 24 of the case body 1 so that the bending, oscillating span of the lock plate means is made larger. Therefore, the intermediate portion of the lock means 15 lies in the most adjacent portion between a tape reel 3 and the side wall 24 of the case. Therefore, there is the disadvantage that the lock means 15 may contact the tape 4 and damage it when operating the release button 17.

In order to avoid such a problem, the thickness of the side wall 24 of the conventional cartridge case has been made thin so that the lock means 15 is separated from the tape reel 3 as far as possible. However, it is still insufficient to prevent the abutting disturbance between the lock means 15 and the tape 4. On the contrary, the thinning of the side wall 24 of the case body 1 results in a lock of strength of the cartridge case. Therefore, there occurs a new problem that the case body 1 is easily deformed torsionally only by applying a small force or that the side wall 24 will break or be damaged when the case is, for example, dropped.

Moreover, since the engagement state between the lock top 16 and the engaging recess 23 is maintained only by the elastic force of the lock means 15, which is in a free condition, it is difficult to obtain a sufficient engagement force for locking the front lid 10. Therefore, there has been the fear that the front lid 10 may be opened by applying a small external force. Furthermore, since the lock means 15 is made of a plastic molded resin, when using the tape cartridge in a high temperature, there occurs creep deformation in the lock means 15 so that there is a chance of further lowering the engagement force of the lock means 15 and therefore a problem regarding the reliability thereof.

SUMMARY OF THE INVENTION

Therefore, it is an object of the present invention to provide a tape cartridge locking mechanism which will overcome the above-mentioned disadvantages.

It is a further object of the present invention to provide a tape cartridge with a front lid locking mechanism which will prevent damage to a tape in the cartridge case while not lowering the strength of the cartridge case.

Another object of the present invention is to provide a tape cartridge having a lock means with good reliability capable of locking the front lid securely for a long period.

Still, another object of the present invention is to provide a tape cartridge having a lock means which is made compact so as to be smoothly accommodated in a predetermined space in the cartridge case.

The foregoing objects and others are accomplished in accordance with the present invention by providing a tape cartridge according to the present invention, wherein there is accommodated a lock means for locking the front lid of a tape cartridge in a closed state onto the inner surface of the side wall of the case body. The lock means comprises a lock tip for detachably engaging with an engaging recess defined in the front lid and a release button projected outside the case through a window of the side wall.

In the present invention, the lock means is held and guided by a guiding means to be moved generally in parallel with the direction of the thickness of the side wall of the cartridge case throughout the movement of the lock means between the locked state, i.e., the state of abutting the side wall of the case, in which the lock tip is engaged with the engaging recess and the unlocked state, i.e., the state of being detached from the side wall, in which the lock tip is detached from the engaging recess. In order to accomplish the above, there is provided a plate spring member, different from the lock means, for pressing and biasing the lock means in the locked state, this plate spring member being accommodated in the case body so that the spring pressure thereof is applied to the lock means opposite to the release button.

In the tape cartridge according to the present invention, there is accommodated a plate spring member, different from the lock means, the elastic force of the plate spring member being selected independently of the longitudinal length of the lock means so as to obtain a suitable spring characteristic, whereby the longitudinal length of the lock means can be made sufficiently small so as to be secured in a smaller space inside the cartridge case, compared to the lock means of the conventional tape cartridge in which the lock means per se has a spring function. The spring pressure of the plate spring member is applied to the rear portion of the lock means, opposite to the release button 17, so that the state of the lock means is changed between the locked state and the unlocked state generally in parallel with the direction of the thickness of the side wall 24 of the cartridge case, whereby the movement region of the lock means can be made to be small enough so as to realize the miniaturization of the tape cartridge.

Thus, it becomes possible to accommodate the lock means on the front portion of the side wall in a limited small space in the tape cartridge, thereby preventing the lock means from interfering with the tape and eliminating the problem of lowering the strength of the cartridge case because of accommodating the lock means in the cartridge case.

Since the lock means is securely biased by the plate spring member apart from the lock means itself, even in the case of using the tape cartridge under a condition of high temperature, the spring characteristic is not changed and the engaging force is sufficiently applied to the lock tip so as to secure the locked state for a long period.

DETAILED DESCRIPTION OF THE PREFERRED EMBODIMENTS

Figure 1:
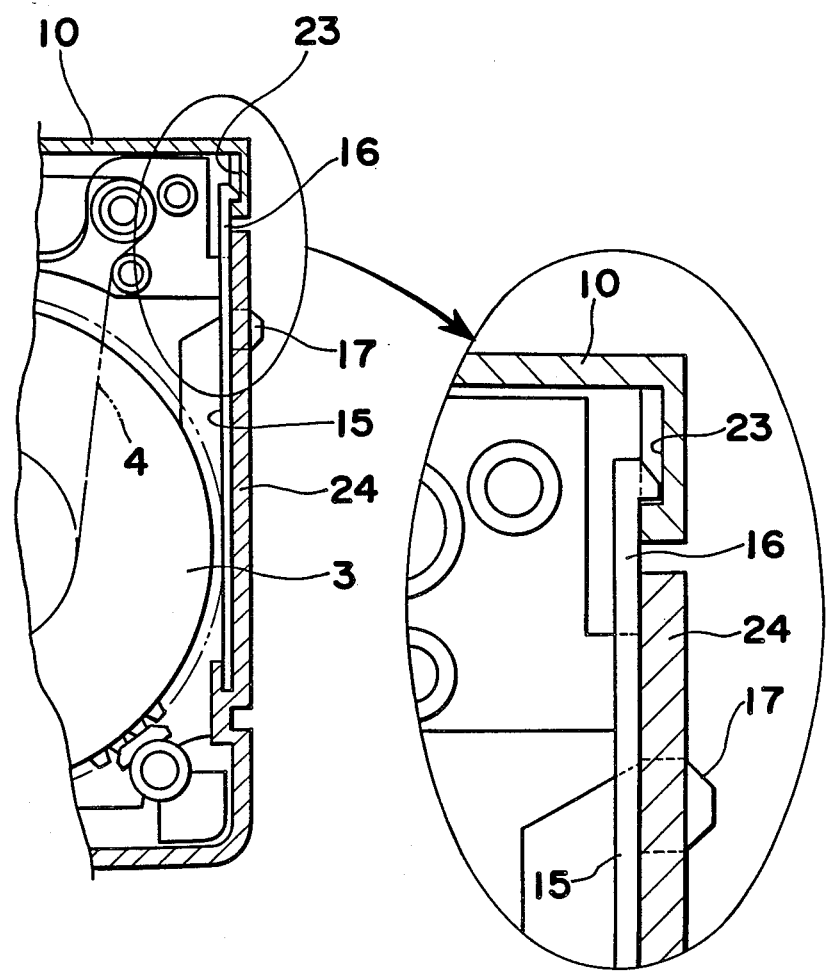
FIG. 1 is a cross sectional plan view showing an essential part of the conventional tape cartridge.
Figure 2:
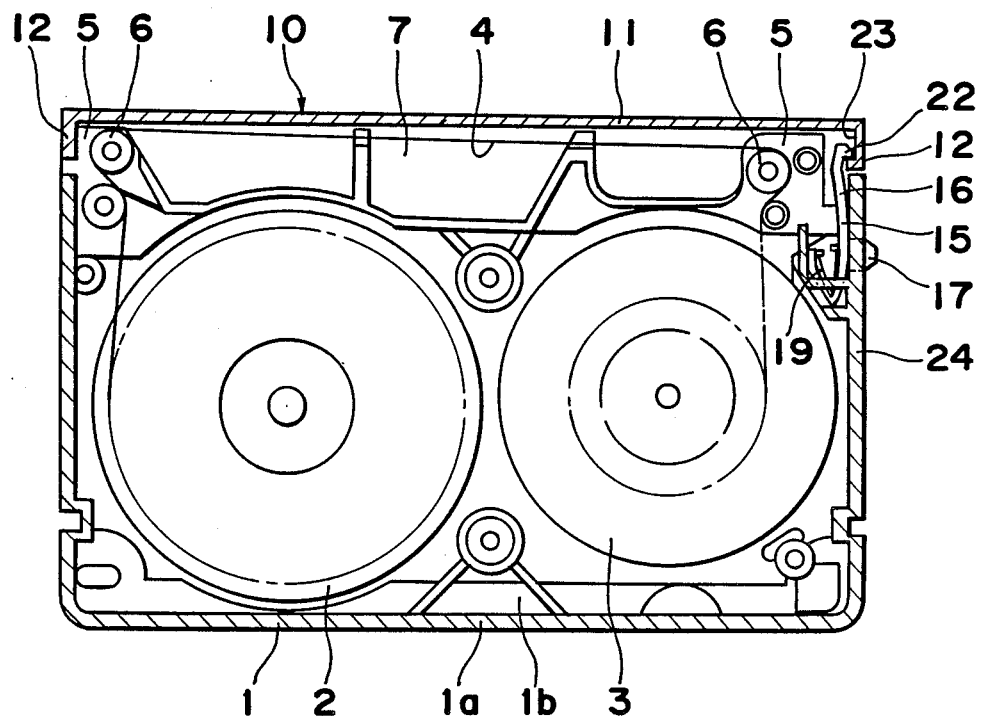
FIG. 2 is a cross sectional view of the tape cartridge of the present invention.

As shown in FIG. 2, reference numeral 1 denotes a case body having an upper case 1a and lower case 1b combined to form the case body by fitting the cases 1a and 1b to each other. There are provided a pair of tape reels 2 and 3 in the right and left portions in the case body 1. The tape 4 is fed from the reel 2 through guide rollers 6, 6 provided in tape drawing openings 5, 5 in the right and left front end portions inside the case body 1 across a tape loading pocket 7 so as to be rolled up by the other reel 3.

In the case body 1, there is pivotally attached a front lid 10 capable of opening and closing for covering and protecting the outer surface of the front portion of the tape 4 when the tape cartridge is not in use.

Figure 5:
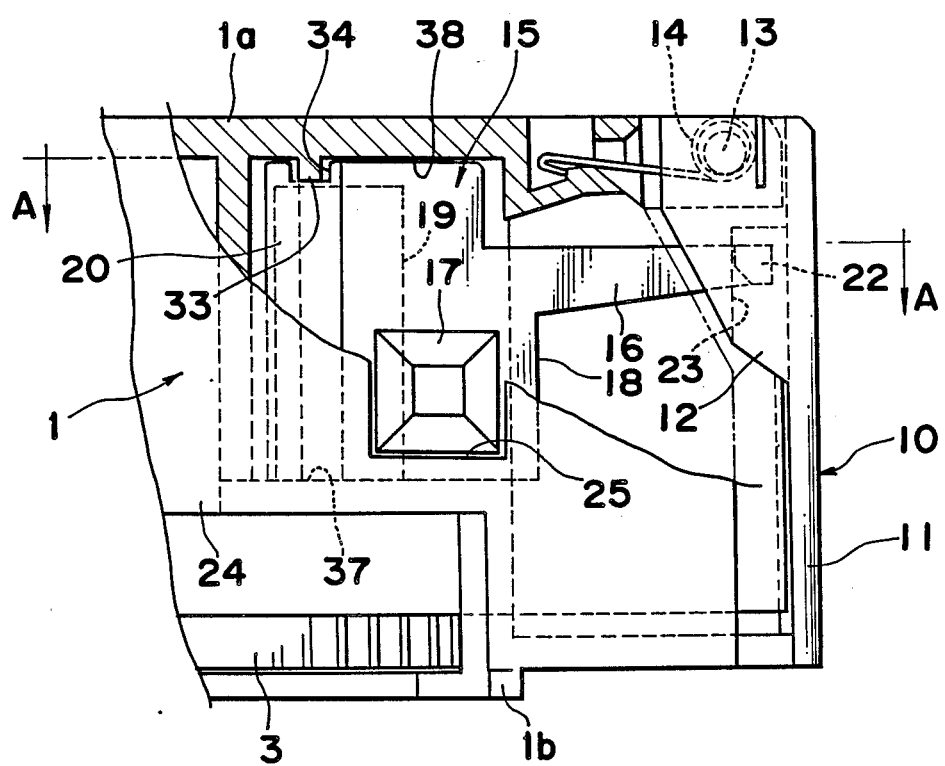
FIG. 5 is a partially cutaway side view of an essential part of the cartridge case.

As shown in FIGS. 2 and 5, the front lid 10 comprises a main wall 11 covering the entire front portion from the right to the left edge portions of the case body 1 and connecting portions 12 projected from the upper portions of the right and left edges of the main wall 11 to the rear portion of the cartridge case integrally molded with plastic material. The top portion of each of the connecting portions 12 is pivotally connected to the upper case 1a through a pivot 13 so that the front lid 10 is pivotally rotated around the pivot 13. A torsion coil spring member 14 is mounted by rolling on one of the pivots 13 and one end portion of the spring member 14 is engaged to the front lid 10 and the other end portion of the spring member 14 is engaged to the upper case 1a, whereby the front lid 10 is always rotatably biased to the closed state.

A lock means 15 for locking the front lid 10 in the closed state is provided in the front portion on the inner surface of the side wall 24 of the case body 1.

Figure 3:
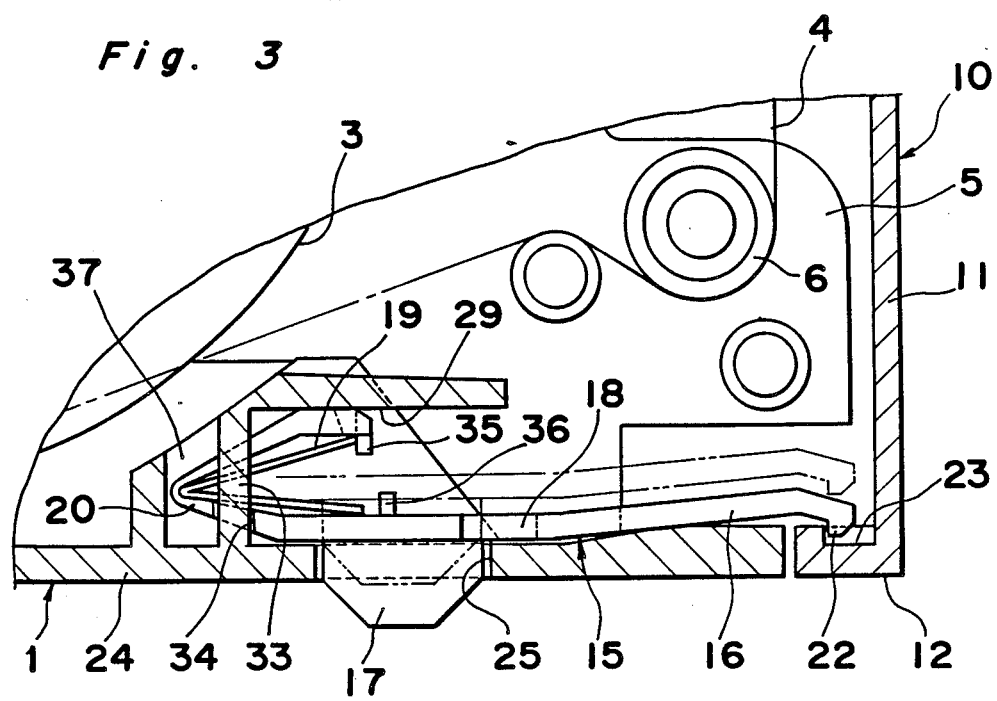
FIG. 3 is an enlarged cross sectional plan view of an essential part of the tape cartridge of FIG. 2.
Figure 4:
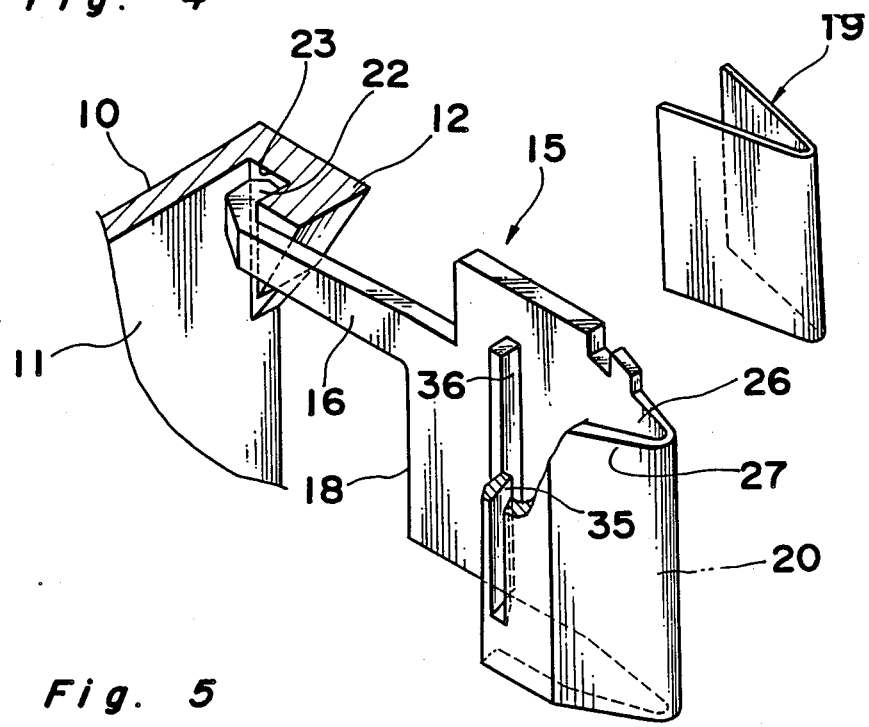
FIG. 4 is a perspective view showing an engagement relation between the lock means and the front lid.

As shown in FIGS. 3 and 4, the lock means 15 comprises a lock plate body 18 having a lock tip 16 formed in the front portion thereof and a hinge portion 20 for holding the lock plate body 18 movably, generally parallel with the direction of the thickness of the side wall 14. A release button 17 is formed in the middle portion of the lock means 15. The different parts of the lock means 15 are integrally molded with a plastic material, such as polyacetal.

In addition, a plate spring body 19, different from the lock means 15, is provided for press-biasing the lock body 18 in the locked state along the direction of the thickness of the side wall 14 of the case body 1.

The lock tip 16 mentioned above projects to the front portion of the case body 1 from the lock plate body portion 18 of the lock means 15 and an engaging tip 22 projects to the outside at the end portion of the lock tip 16. The engaging tip 22 is detachably engaged with the engaging recess 23 defined on the inner surface of the connecting portion 12 of the front lid 10, locking the front lid 10 in the closed state when the tape cartridge is not in use. The release button 17 is formed as a projection in a shape of a square, truncated pyramid, and projects outside the cartridge case through a window 25 contained in the side wall 24 of the case body 1 when accommodating the lock means 15 in the case body 1. The release button 17 releases the engaging tip 22 from the recess 23 when the tape cartridge is in use.

Figure 7:
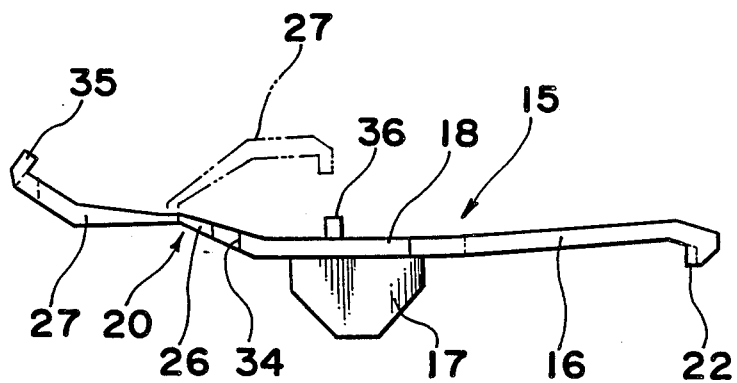
FIG. 7 is a plan view of the lock means in an unfolded and folded condition.

As shown in FIG. 7, the hinge portion 20 is molded integrally with the lock body 18 in an unfolded state as a plate body connecting to the end portion of the lock body 18, which is formed in a shape of the hinge mold when accommodating the lock means 15 in the case body 1.

As shown in FIG. 4, the hinge portion 20 comprises a first hinge arm 26 connected to the rear portion of the lock body 18 and second hinge arm 27 connected to the first hinge arm 26, wherein both of the first and second hinge arms 26 and 27 are bent and opposed to form a "V" character shape in plan view symmetrically with respect to a symmetric axis passing through the center of the hinge arms 26 and 27 under the condition of accommodating the lock body 18 in the case body 1. The bottom faces of both hinge arms 26 and 27 are made to be coincident with the bottom face of the lock body 18.

As shown in FIG. 4, the plate spring member 19, mainly made of a metallic plate such as a stainless steel thin plate is generally formed by bending to be "L" character shape in a free condition thereof. Also, the plate spring member 19 may be formed to be a flat plate shape in a free condition. In any case, the plate spring member 19 is elastically deformed to be "V" character shaped and is accommodated in the case body 1 generally in parallel with the inner surface of the hinge portion 20. Thereby, one of the free end portions of the plate spring member 19 abuts to the inner surface of the second hinge arm 27 and the other free end portion thereof abuts to the inner surface of the side wall of the lock plate body 18 corresponding to the release button 17 so that the lock body 18 is resiliently biased in the locked state so as to be pressed to the side wall 24 of the case body 1. The biasing force of the lock body 18 is mainly obtained by the biased plate spring member 19 and the hinge portion 20 generates a biasing force only to a degree of supporting the plate spring member 19.

There are provided means to regulate the shift of the plate spring member 19 forward to the front lid 10 when the tape cartridge is in use, particularly when operating the lock means 15 to be in the release state. As the regulating means mentioned above, there is formed a rule rib 35 projected at the end portion of the second hinge arm 27, and similarly there is formed a rule rib 36 projected on the inner surface of the lock body 18. The position of the rule rib 36 is shifted back and forth from that of the rule rib 35 in the forward direction so as to obtain a large stroke of the lock body 18 at the time of releasing the locked state. Moreover, at least one of the rule rib 35 or 36 may be required.

Figure 6:
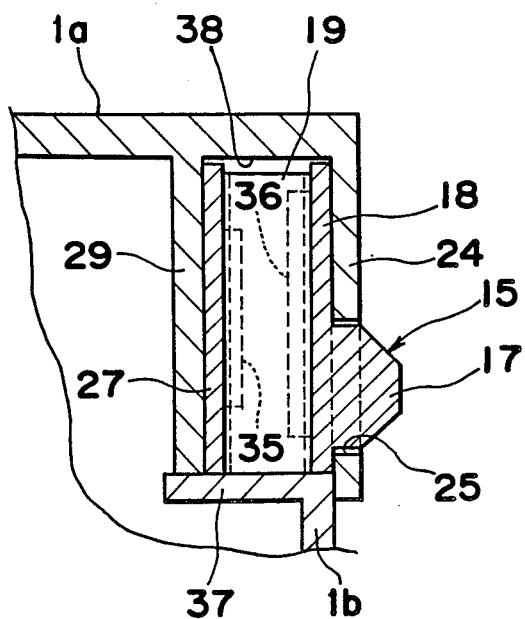
FIG. 6 is a cross sectional view along the line A-A in FIG. 5.

As shown in FIG. 6, there is formed a holding wall 29 for holding and securing the second hinge arm 27, projected in parallel with the side wall 24 of the case, downward from the inner surface of the upper wall of the upper case 1a. There is formed a situating rib 33 projected between the rear top portion of the holding wall 29 and the side wall 24 of the case, which is engaged with a cut portion 34 in the top edge of the first hinge arm 26, thereby regulating the movement of the lock means 15 back and forth particularly in the forward direction. Upon regulating the positions of the lock body 18 and the plate spring member 19 as described above, when the release button 17 is depressed inside the case by an external force applied to the lock means 15 in the direction from the front lid 10 to the front portion of the case, the movement of the lock means 15 in the forward direction can be prevented.

As shown in FIG. 3, when mounting the lock means 15 in the case body 1, the first and second hinge arms 26 and 27 are bent in a shape of the "V" character and the release button 17 is inserted through the window 25 of the side wall 24 so that the cut portion 34 is engaged with the situating rib 33. Under the mounting condition, as shown in FIGS. 3 and 5, the lower surface of the lock body 18 and of the hinge portion 20 is held by a guide wall 37 horizontally formed on the lower case 1b. Moreover, the upper surface of the lock body 18 and of the first hinge arm 26 is held to be guided by a guide wall 38 utilizing the inner surface of the upper wall of the upper case 1a. The guiding hold of both guide walls 37 and 38 and the flexible bending of the hinge portion 20 due to the movement of the lock body 18 moves the lock body 18 between the locked state and the unlocked state maintaining the state generally in parallel with the direction of the thickness of the side wall 24 of the case. The regulation of the movement of the lock body 18 by the situating rib 33 also secures the above mentioned parallel motion.

FIG. 3 shows a locked state, wherein the engaging tip 22 formed at the tip portion of the lock tip 16 is engaged with the engaging recess 23 defined in the front lid 10 in the closed state, i.e., in the state when the tape cartridge is not in use. In this state, when the tape cartridge is inserted in a tape deck, an operating portion of the tape deck depresses the release button 17 inside the case, whereby the lock body 18 is deformed in the direction inside the case pressing the plate spring member 19 so that the engaging tip 22 of the lock tip 16 is detached from the engaging recess 12, as shown by the imaginary (phantom) broken lines in FIG. 3. Subsequently, in case the tape cartridge is mounted in a tape player, a lock releasing member of the tape player releases a lid lock member so that the front lid 10 is rotated to be opened upward opposing to the resilient force of the spring member 14. When the front lid 10 is closed by the spring member 14, the engaging tip 22 of the lock tip 16 is engaged with the engaging recess 23 by the elastic force of the spring plate member 19 so as to lock the front lid returning to the former closed state.

Figure 8:
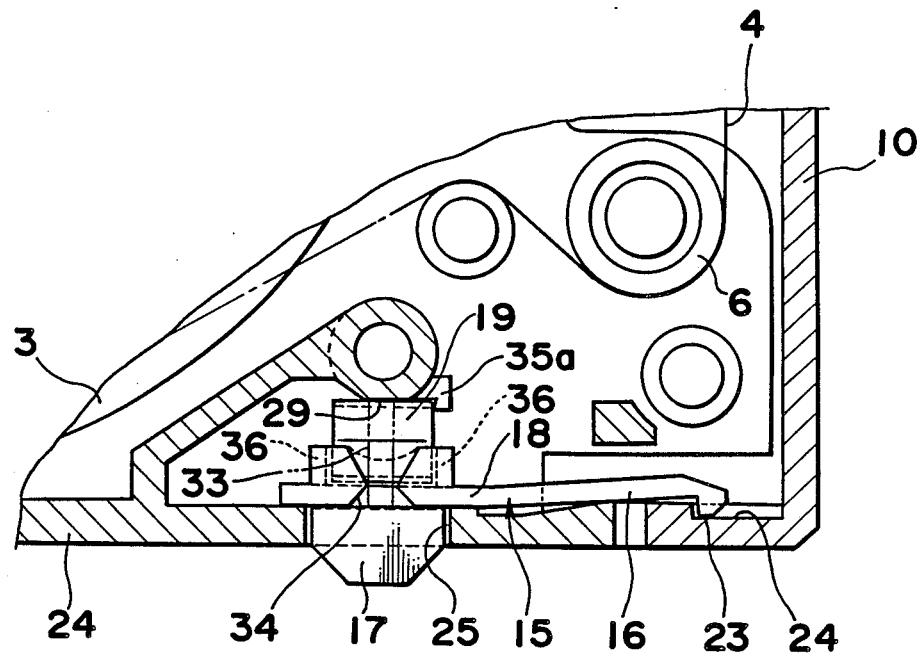
FIG. 8 is a cross sectional plan view of an essential part of a second embodiment of the tape cartridge according to the present invention.
Figure 9:
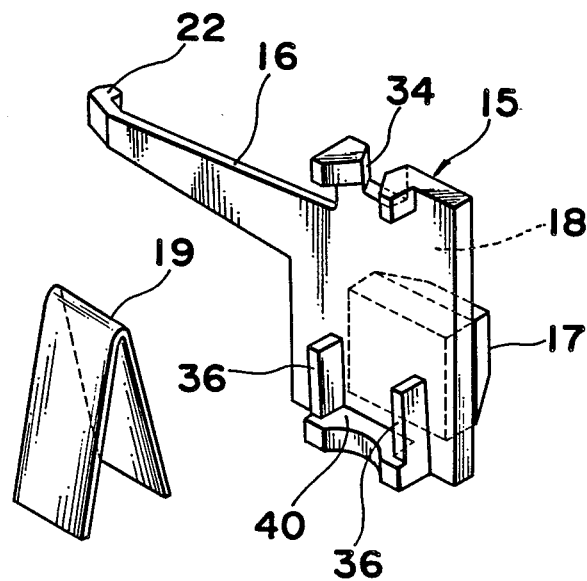
FIG. 9 is a perspective view of the lock means of FIG. 8.

FIGS. 8 and 9 show a second embodiment of the tape cartridge according to the present invention, wherein the plate spring member 19 is accommodated in the case body 1 in a shape of an upside down "V" character to the front lid 10 and the hinge portion 20 is omitted. Also, in this case, one end portion of the plate spring member 19 abuts to the side wall of the rear portion of the release button 17 and the other end portion thereof directly abuts to the holding wall 29. There is provided a rule rib 35a on the holding wall 29. Moreover, in order to prevent the lock body 18 from falling down, there is formed a leg means 40 projected in the horizontal direction between the bottom portions of the rule ribs 36 and 36 so as to be received by the guide wall 37.

As described above, in order to move the lock body 18 generally in parallel with the direction of the thickness of the side wall 24 of the case, it is not always required to form the hinge portion 20.

As described above in both embodiments, though both the top and bottom surfaces of the lock body 18 are held by the guide walls 37 and 38 respectively, it is not always required to do so. For example, there may be formed a wall member projected horizontally on the middle portion of the top and bottom of the lock body 18 so as to be held by the guide walls. In other words, any means may be used if the means can hold the lock body 18 movably generally parallel with the direction of the thickness of the side wall 24.

Moreover, though the plate spring member 19 is bent to be made "V" character shaped in sectional view in the above embodiments, the plate spring member 19 having other sectional view such as N, M or W character shape can be formed.

What is claimed is:
1. A tape cartridge comprising:
   a case body (1) having a front lid (10) in the front portion thereof said front lid having an engaging recess (23) formed therein;
   lock means (15) accommodated in a side wall (24) of said case body (1) in a space within said case body juxtapositioned to a front tape guide roller in front of a corresponding tape reel, said lock means (15) comprising a lock plate body (18) having a lock tip (16) detachably engaged with said engaging recess (23) defined in said front lid (10);
   a release member (17) which projects outside through a window defined in said side wall (24) for pressuring said lock means (15);
   guide means for guiding and holding said lock means (15) so that said lock tip (16) may move in a direction parallel with the thickness of said side wall (24) throughout the movement from a locked state in which the free end tip portion of said lock means (15) is engaged with said engaging recess (23) to an unlocked state in which the free end tip portion of said lock means (15) is detached from said engaging recess (23); and
   a spring member (19) for pressing said lock means (15) towards a locked state.
2. The tape cartridge according to claim 1, wherein said spring member (19) is positioned so as to apply pressure on a portion of said locking means correspond- ing to where said release member is situated so that said lock plate body (18) is resiliently biased in said locked state so as to be pressed to said side wall of said case body.

3. The tape cartridge of claim 1, wherein said lock means (15) comprises said lock plate body (18) having a hinged portion (20) integrally molded with said lock plate body (18) on an end of said lock plate body opposite said lock tip (16), said hinged portion comprising first and second hinge arms forming a "V" shape, and said spring member is accommodated within said "V" shaped hinged portion of said lock means.

* * * * *